March 22, 1949.  H. NOYES  2,464,827
FUEL TANK FOR MILITARY AIRCRAFTS
Filed Aug. 27, 1947
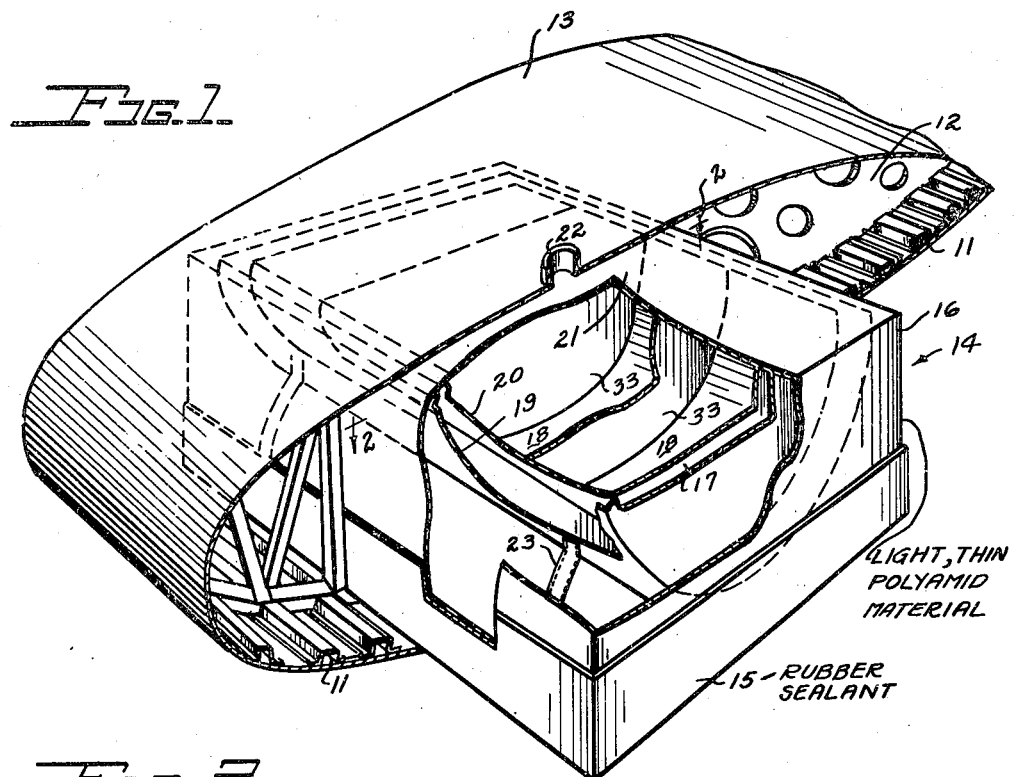
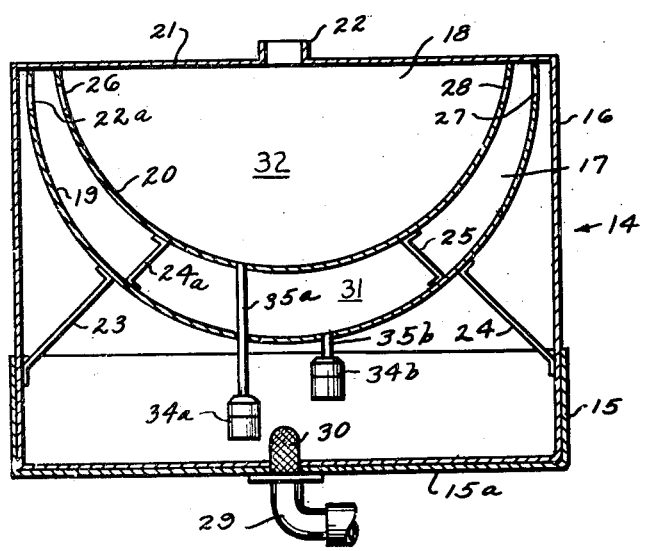
INVENTOR.
HOWARD NOYES
BY Wade Koontz AND
Chester Tietig
ATTORNEYS Patented Mar. 22, 1949

2,464,827

UNITED STATES PATENT OFFICE 2,464,827

FUEL TANK FOR MILITARY AIRCRAFT

Howard Noyes, Dayton, Ohio

Application August 27, 1947, Serial No. 770,844

9 Claims. (Cl. 220—63)

(Granted under the act of March 3, 1883, as amended April 30, 1928; 370 O. G. 757)

The invention described herein may be manufactured and used by or for the Government for governmental purposes without payment to me of any royalty thereon.

This invention relates to a fuel tank for military and naval aircraft.

One object of the invention is to provide a tank which is protected against gunfire.

Another object is to provide a tank in which the direction of fuel leakage is controlled when an upper tank is punctured, so that leakage will be caught in a space from which it will be available for use.

Another object of the invention is to provide a tank which, if punctured by gunfire in its lower portion, will continue to function without substantial loss of fuel.

Another object is to provide a tank which, when punctured by gunfire in its upper portions, will also continue to function without substantial loss of fuel.

Another object is to provide a tank which is materially lighter than those of analogous types.

Referring now to the drawings:

Fig. 1 is a perspective view of a fuel tank according to my invention. It is shown mounted in a cross section of an airplane wing and is broken away to show the interior.

Fig. 2 is a cross section of the tank taken on the line 2—2 of Fig. 1.

In Fig. 1, 10 is a cross section of a conventional airplane wing in which 11—11 are stringers, 12 is a rib and 13 is the outer wing surface.

In Figs. 1 and 2, 14 is a bladder cell, the lower and outer part 15 of which is a sealant of the rubber type which swells in hydrocarbon fuels such as gasoline. The upper part 16 of bladder cell 14 is not protected by rubber type sealants. It is here that one advantage of the invention lies, because three plies of a material weighing 0.10 lb. per sq. ft. is substituted for the rubber sealant, a material which weighs 1.75 lbs. per sq. ft. The substitute material is a linear polyamide sheet of the Du Pont type.

The fuel volume confined by the bladder cell 14 is divided into additional cells 17 and 18. Only two such additional cells are shown for purposes of illustration, but their number is not limited. Their walls 19 and 20 respectively, are made of the same material as the top 16 of the bladder cell 14. The walls 19 and 20 are suspended from a cover 21, also of identical material, in which there is a filling aperture 22.

Spacing struts 23 and 24 space the wall 19 and support it in the bladder cell 14 from the sealant walls 15. Struts 24a and 25 support the wall 20 from the wall 19. Air vents 22a, 26, 27 and 28 are provided near the top of walls 19 and 20 to equalize pressures throughout the tank and to aid in filling the tank. In the bottom 15a of the tank there is a pipe which leads to one or more engines (not shown). Within the tank a screen 30 is provided to filter the fuel before use.

The compartments 31 and 32 defined by walls 19 and 20 respectively, may be divided across by as many cross baffles 33 as may be desired. A sequencing valve 34a or -b at the end of a pipe 35a or -b is provided for each inner compartment 17 and 18. That one, 34a which controls cells 18 extends to a lower level than that one, 34b which controls cell 17. The valves are well known in the art and comprise floats and float chambers. After the contents of a tank have drained below the valve level, they open the inlet to that tank from the auxiliary tank outlet.

When the tank is subjected, in an airplane, to gunfire from below (the usual case), the following action generally occurs: If a projectile penetrates merely the lower part of the tank, i. e. the portion enclosed by sealant 15 and 15a, then the breach will generally heal merely by the swelling of the sealant by contact with the fuel. If the wall 19 is also punctured, the fuel which was enclosed in the cell 17 will drain down into the space enclosed by the sealant 15; consequently it will not generally be lost. If the projectile also penetrates the wall 20, the fuel contents of space 18 will also drain into the space enclosed by the sealant 15. Should the sealant-enclosed space be penetrated by a projectile beyond the capacity of the sealant to repair, but the cells 17 and 18 remain unruptured, emergency repairs are possible by connecting the tubes 35a and 35b to the engine feed pipe 29. In such case, screen 30 and the sequencing valves 34a and 34b would be removed and short lengths of tubing would be connected to the pipe 29. This work could be done through the opening made by the projectile. Such opening could be enlarged as much as necessary with a knife or other tool. A great saving in weight is accomplished by making only the bottom of cell 14 sealant-protected, while the chances of losing fuel are not greatly increased.

As the fuel level in the sealant-protected space falls, first the sequencing valve 34b will be uncovered. The float (not shown) in that valve will then fall, thereby allowing fuel from cell 17 to flow down into the sealant-protected space. After the fuel level falls below the level of sequencing valve 34a, the same action will take place in regard to the fuel in cell 18.

Each space as defined by two cross baffles 33 may have its own pipe similar to 35a or -b and its own sequencing valve. By so providing a plurality of sequencing valves, the bad effect of the sticking shut of any one of them is minimized.

It is to be observed that the light, tough flexible sheet material of which the upper part 16 of the outer cell is made, continues also within the sealant 15 to form an inner lining therefor. By such construction, joints are avoided and the sealant is prevented from swelling until the swelling action takes place by reason of a rupture of the lining.

In the foregoing specifications and the appended claims, the word "sealant" means a material that will actually stop a fuel leak, it does not mean a material that merely retards the leak or absorbs the voided liquid.

I claim as my invention:

1. In an airplane fuel tank an outer cell of light, tough flexible sheet material adapted to contain fuel, an outer coating of rubber type sealant about the lower part of said cell, a plurality of inner cells substantially concentric with each other formed of semicylindrical walls of light, tough flexible sheet material adapted to contain fuel, said walls having vents adapted to equalize the pressure throughout all of the cells, a pipe connecting each inner cell to the interior of said outer cell, a filler pipe serving the innermost cell and the surrounding inner cells and a delivery pipe in the wall of the outermost cell.

2. An airplane fuel tank according to claim 1 and in addition an internal pipe for each inner cell connecting its own cell to the sealant enclosed space, and a sequencing valve at the lower end of each pipe.

3. An airplane fuel tank according to claim 2 in which the sequencing valve for the inner tank is mounted at a substantially lower level than that of the next adjacent outer tank.

4. An airplane tank according to claim 2 in which the inner cells are provided with cross baffles to define a plurality of smaller cells therein.

5. An airplane tank according to claim 2 in which the inner cells are provided with cross baffles to define a plurality of smaller cells therein and each cell has its own internal pipe to the sealant enclosed space and its own sequencing valve thereon.

6. An airplane fuel tank comprising a bladder cell of a light sheet material not affectable by the fuel which it is to contain, a rubber sealant adhesively attached to the lower outer portion of said cell, the upper interior portion of said cell containing a plurality of substantially concentric semi-cylindrical partitions whereby to form sub-cells, delivery means from each sub-cell to the lower sealant-surrounded part of the bladder cell and means for successively emptying fuel from each next adjacent sub-cell into the lower part of the bladder cell.

7. In an airplane fuel tank, an outer cell of light, tough flexible linear-polyamid sheet material adapted to contain fuel, an outer coating with rubber-type sealant about the lower part of said cell, a plurality of inner cells substantially concentric with each other formed of semi-cylindrical walls of light, tough flexible linear polyamid sheet material adapted to contain fuel, said walls having vents adapted to equalize the pressure throughout all of the cells, a pipe connecting each inner cell to the interior of said outer cell, a filler pipe serving the innermost cell and the surrounding inner cells and a delivery pipe in the wall of the outermost cell.

8. In an airplane fuel tank, an outer cell of light, tough, flexible sheet material adapted to contain fuel, an outer coating of rubber-type sealant about the lower part of said cell, a lining of light, tough sheet material unaffectable by fuel, for said sealant coating, a plurality of inner cells substantially concentric with each other formed of semi-cylindrical walls of light, tough, flexible sheet material adapted to contain the fuel, said walls having vents adapted to equalize the pressure throughout all of the cells, a pipe connecting each inner cell to the interior of said outer cell, a filler pipe serving the innermost cell of the surrounding inner cells and a delivery pipe in the wall of the outermost cell.

9. An airplane fuel tank comprising a bladder cell of light sheet material not affectable by the fuel which it is to contain, a sealant adhesively attached to the lower outer portion of said cell, the upper portion of said cell containing a semicylindrical partition whereby to define a sub-cell, delivery means from said sub-cell to the lower sealant-surrounded part of the bladder cell and means for emptying fuel from said sub-cell into the lower part of said bladder cell.

HOWARD NOYES.

REFERENCES CITED

The following references are of record in the file of this patent:

UNITED STATES PATENTS

| Number | Name | Date |
| --- | --- | --- |
| 1,309,526 | Kahn | July 8, 1919 |
| 1,393,719 | De Save | Oct. 11, 1921 |

FOREIGN PATENTS

| Number | Country | Date |
| --- | --- | --- |
| 83,220 | Austria | Mar. 10, 1921 |
| 319,918 | Germany | Apr. 7, 1920 |
| 367,579 | Great Britain | Feb. 25, 1932 |